J. H. TIETGE.
BEET HARVESTER.
APPLICATION FILED JUNE 27, 1914.
1,170,944.
Patented Feb. 8, 1916.
4 SHEETS—SHEET 4.
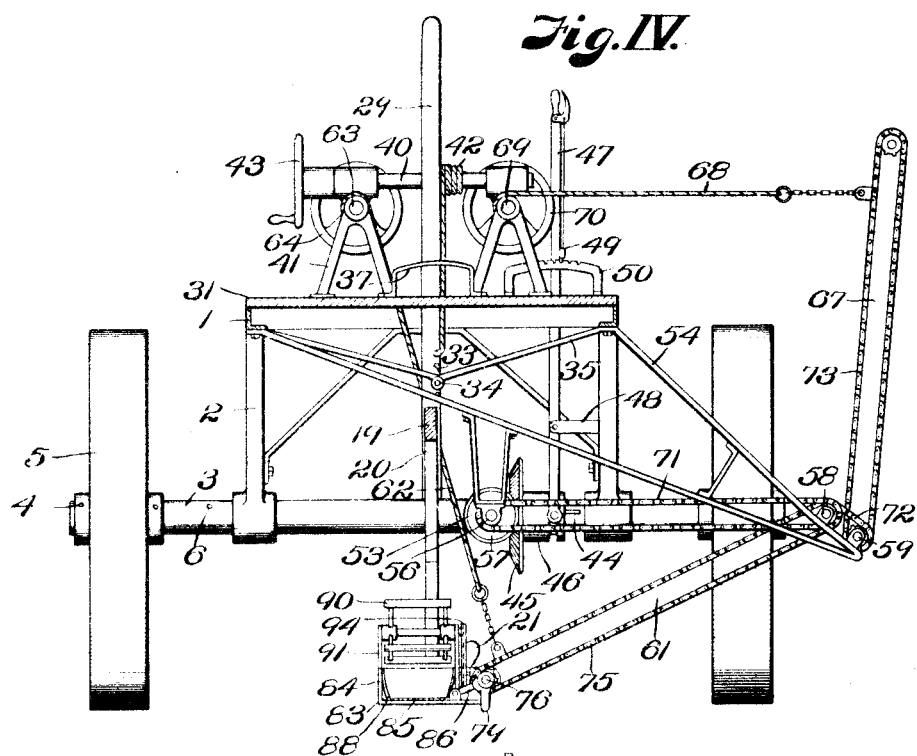
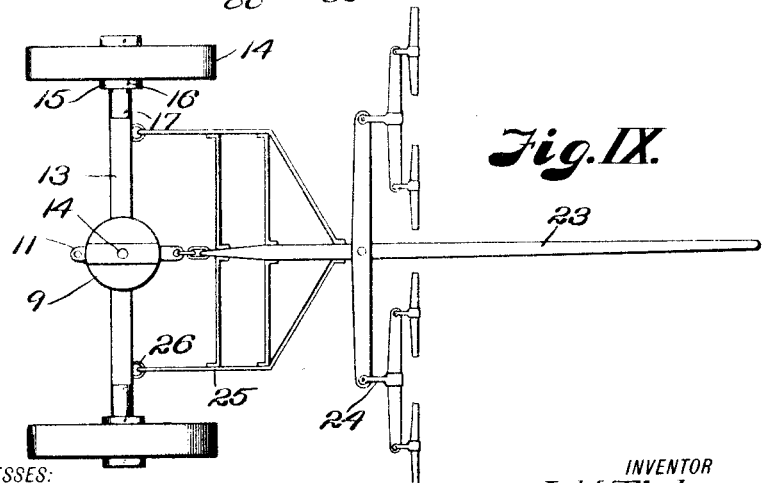
WITNESSES:
Arthur W. Capps.
Lynn A. Robinson.
INVENTOR
J. H. Tietge.
BY
Arthur C. Brown
ATTORNEY

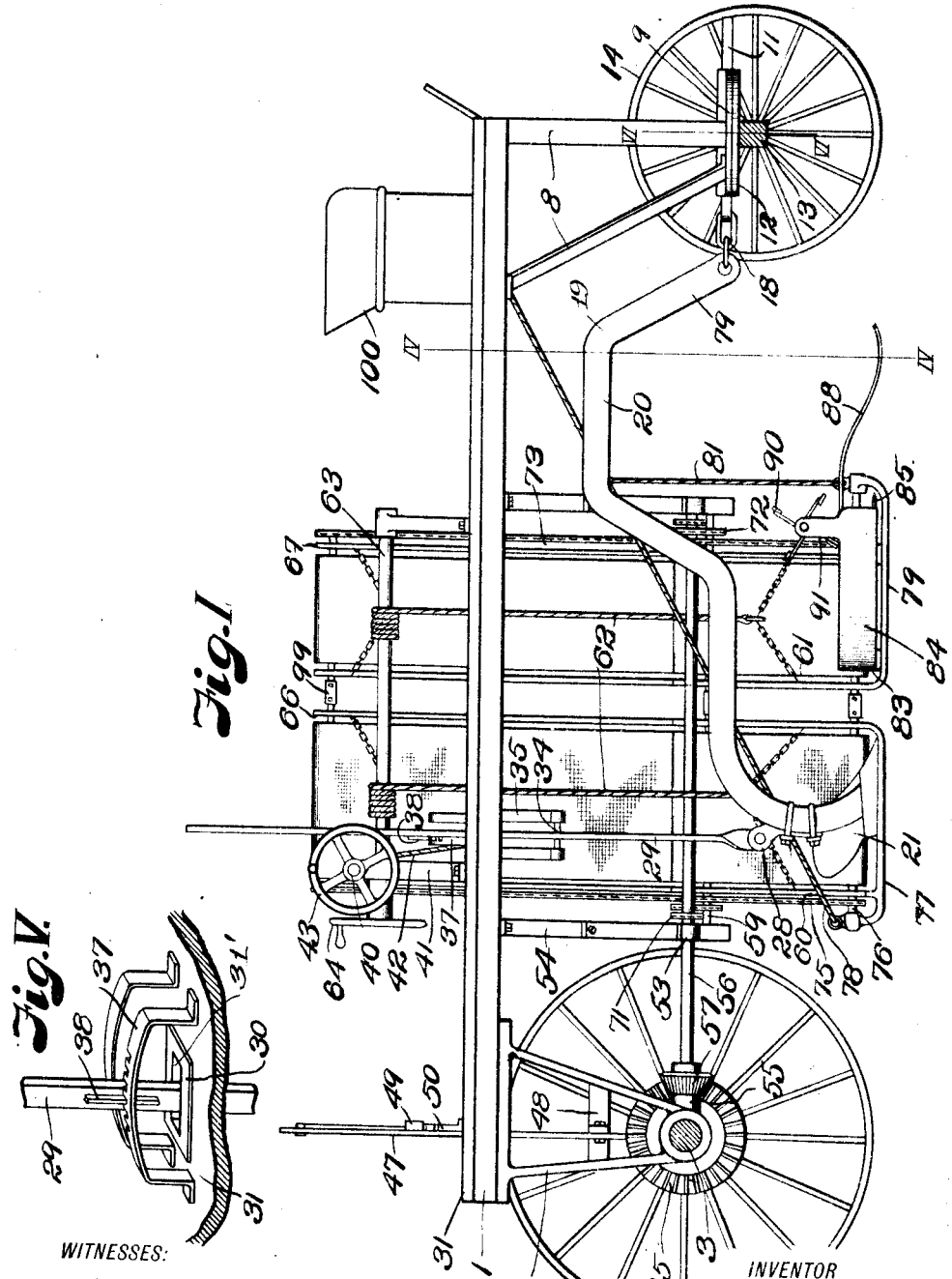

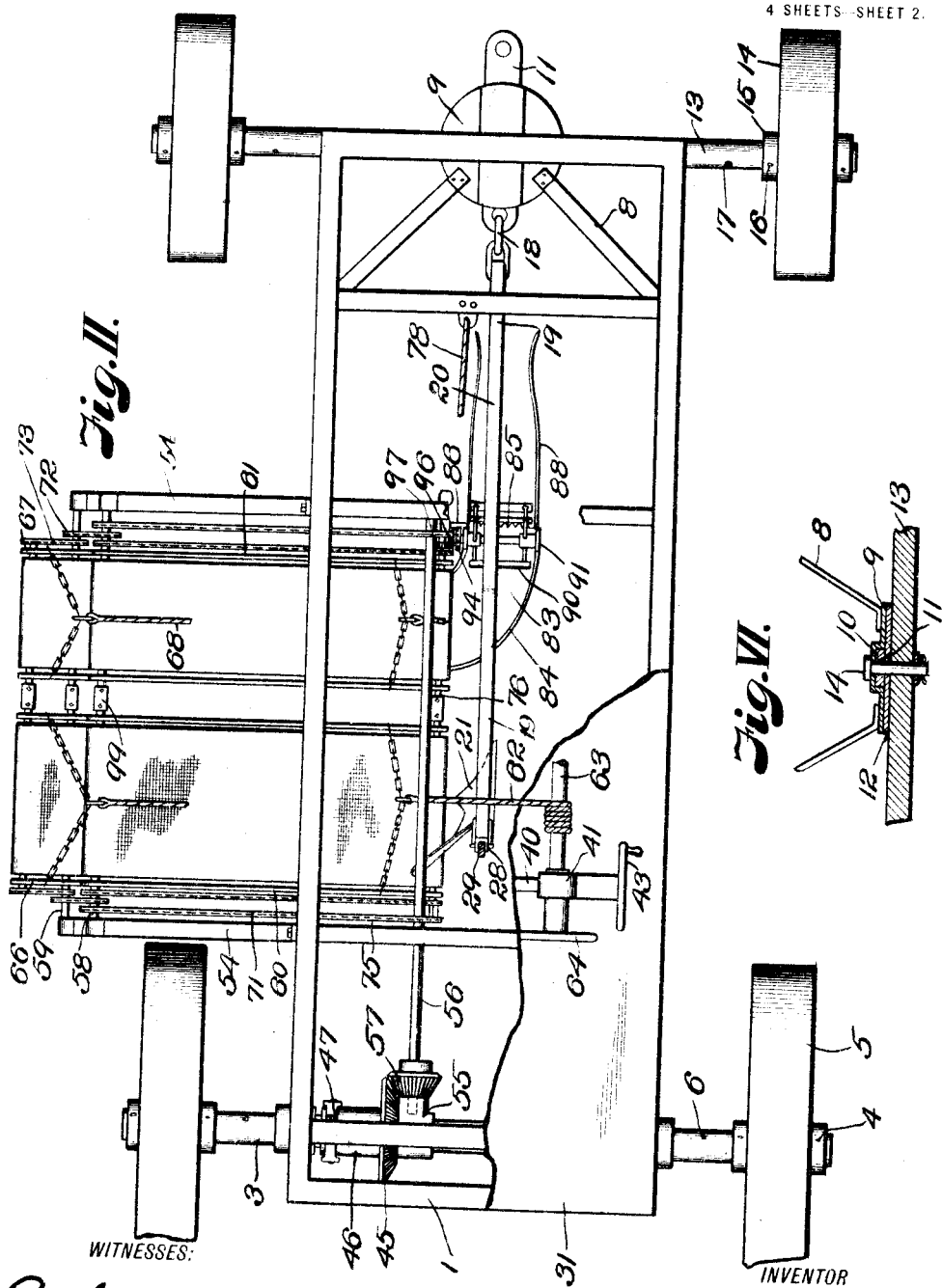
J. H. TIETGE.
BEET HARVESTER.
APPLICATION FILED JUNE 27, 1914.
1,170,944.
Patented Feb. 8, 1916.
4 SHEETS—SHEET 2.
Fig. II.
Fig. VI.
WITNESSES:
Arthur W. Capps.
Lynn A. Robinson.
INVENTOR
J. H. Tietge.
BY
Arthur C. Brown
ATTORNEY

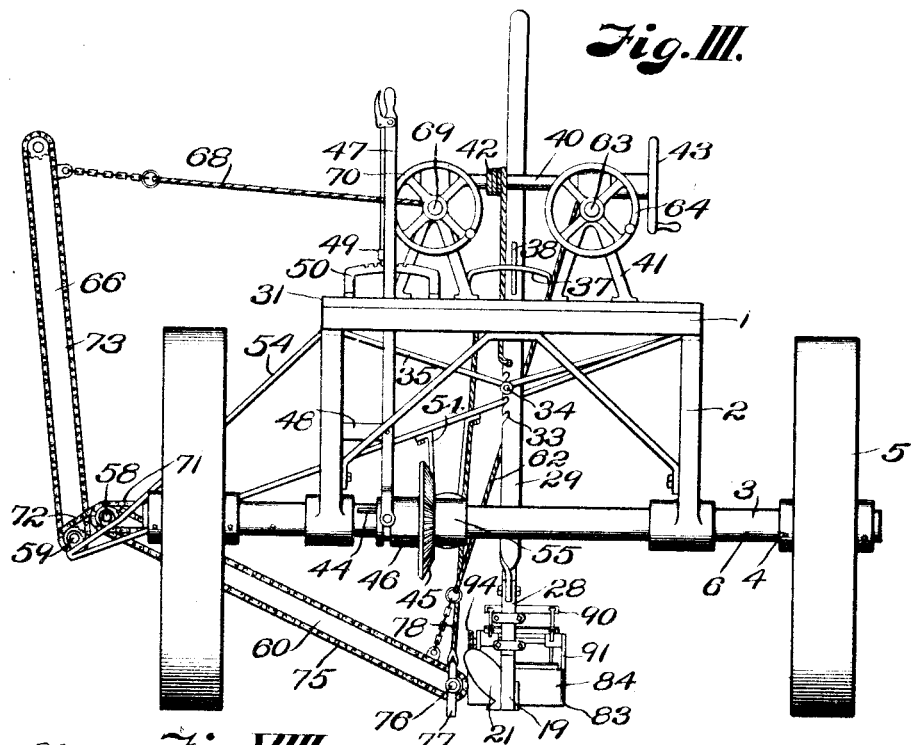

UNITED STATES PATENT OFFICE.

JOHN H. TIETGE, OF KANSAS CITY, MISSOURI.

BEET-HARVESTER.

1,170,944.     Specification of Letters Patent.     Patented Feb. 8, 1916.

Application filed June 27, 1914. Serial No. 847,647.

*To all whom it may concern:*

Be it known that I, JOHN H. TIETGE, a citizen of the United States, residing at Kansas City, in the county of Jackson and State of Missouri, have invented certain new and useful Improvements in Beet-Harvesters; and I do declare the following to be a full, clear, and exact description of the invention such as will enable others skilled in the art to which it appertains to make and use the same, reference being had to the accompanying drawings, and to the letters and figures of reference marked thereon, which form a part of this specification.

My invention relates to beet harvesters, and more particularly to a machine for harvesting sugar beets; the principal object of the invention being to provide a machine which may be drawn through the field to cut the tops from the beets, dig the beets from the ground, and elevate the tops and beet bodies to a wagon box.

In accomplishing this object, I have provided the improved details of structure hereinafter described and illustrated in the accompanying drawings, wherein:—

Figure I is a side elevation of a beet harvester constructed in accordance with my invention; the wheels on the near side being removed for better illustration. Fig. II is a plan view of the same. Fig. III is a rear elevation of the machine. Fig. IV is a transverse sectional view on the line IV—IV, Fig. 1. Fig. V is a detail view of the plow guiding lever. Fig. VI is a detail sectional view of the fifth wheel taken on the line VI—VI, Fig. I. Fig. VII is a detail perspective view of the lower portion of the forward elevator, showing the sickle and reel. Fig. VIII is a detail perspective view of the lower portion of the forward elevator looking from the left oblique toward the front of the sickle and reel. Fig. IX is a plan view of the front axle and draft gear.

Referring more in detail to the parts: 1 designates a frame, preferably composed of angle iron, and having rear brackets 2 in which is revolubly mounted an axle 3. Rigidly mounted near each end of the axle 3, by means of pins 4 are wheels 5, which may be adjusted inwardly to track in narrow rows by removing the pins 4, moving the wheels inwardly and replacing the pins so as to project through another set of apertures 6 in the axle. Rigidly supported beneath the forward end of the frame, by means of side and rear braces 8 is the upper portion 9 of a fifth wheel, having a central longitudinal base groove 10 in which is mounted a bar 11. Pivotally mounted beneath the portion 9 is the lower part 12 of the fifth wheel to which is rigidly secured the square axle 13; the parts being held in operative relation by means of a king-bolt 14, which passes through the portion 9, bar 11, part 12 and axle 13. Near the outer ends of the axle 13 are wheels 14 which are revolubly mounted on said axle between the collars 15 and which are adapted for adjustment inwardly by removing the pins 16 from the collars and placing them in another set of holes 17 in the axle. Attached to the rear of the bar 11 by means of links 18 is a plow beam 19, which is arched at 20 to permit the front axle to turn on its mounting, and which carries a mold-board 21 at the rear. To the forward end of the bar 11 is secured the tongue 23, so that the draft for the plow is applied directly through the bar 11, thereby making it possible to construct the wagon parts much lighter than if the plow was drawn from the frame. The tongue 23 is provided with swingle and double tree members 24, which are arranged, in the present case, to hitch four abreast, and with a framework 25 which projects laterally from each side of the tongue and is connected with eyes 26 on the axle to provide draft for the running gear.

Pivotally connected with a bracket 28 on the rear of the plow beam 19, is a lever 29, which extends upwardly through a plate 30 secured to the platform 31 of the machine, and which is adapted for manual actuation to direct the transverse travel of the mold-board the platform and plate having a slotted aperture 31′ through which the lever is projected. The lever 29 is provided with a plurality of edge notches 33 adapted to engage a pin 34 supported in brackets 35 on the frame, so that the mold-board may be supported at different elevations and so that the bar may have a substantially pivotal mounting, thereby permitting the plow to be moved laterally from several elevations and locked in various positions by means of the notched quadrant 37 and the elongated pawl 38 on the bar 29.

In order to raise and lower the plow to bring the different notches 33 in engagement with the pin 34, I provide a windlass 40 mounted on the standards 41 of the frame and provided with a rope 42, which is secured to the lever 29, and with a hand-wheel 43 for manipulating the device.

Slidably mounted on the rear axle 3 and on the feather-key 44 is a bevel-gear wheel 45, having a grooved hub 46 for receiving a shifter lever 47 that is pivotally mounted on a bracket 48. The lever 47 is provided with a hand-actuated latch 49, which is adapted to engage the notched quadrant 50, so that the gear 45 may be moved by means of the lever 47 and locked at several points in its travel.

Revolubly mounted in bearings 53, which are carried by brackets 54 on the frame and in a bearing 55 revolubly mounted on the rear axle is a shaft 56, and rigidly mounted on said shaft adjacent the bearing 55 is a bevel pinion 57, which is adapted to receive the bevel gear 45 when the latter is shifted to one limit of its travel, so that as the machine is set in motion, power is transmitted from the rear axle to the shaft 56. The brackets 54 project from the side of the machine and carry shafts 58 and 59, on the former of which are pivotally mounted elevators 60 and 61 that extend downwardly and inwardly to a point near the center of the machine and are provided at their free ends with cables 62 which extend upwardly and connect with a windlass 63. The windlass 63 is mounted in standards 41 on the platform 31 at right angles to the windlass 40 and is provided with a hand-wheel 64 for raising and lowering the elevators.

Pivotally mounted on the shaft 59 on brackets 54 are two similar elevators 66 and 67 which extend upwardly and outwardly from the frame and are provided with cables 68 at their free ends which connect with a windlass 69 which is mounted similarly to and extends parallel with the windlass 63 and is provided with a hand-wheel 70.

The elevators 60 and 61 are driven from the shaft 58, which receives its power at each end from the shaft 56 through the agency of the chain belts 71, while the elevators 66 and 67 are actuated from each side by the shaft 59, which receives its power from the shaft 58 through chain belts 72; the latter elevators being preferably provided with chain belts 73 at each side for applying the motive power to each end of the elevator.

Extending from the shaft 58 along the sides of the elevators 60 and 61 are chain belts 75 which are operatively connected with the shaft 76 at the free ends of said elevators for the purpose presently described. The elevator 60 extends to a point adjacent the mold-board and is adapted to receive beet bodies as they are removed from the ground; the said elevator and the elevator 66 being composed of wire mesh, so that any dirt which adheres to the beet is shaken loose and falls through the elevator before reaching the wagon box (not shown). The lower end of the elevator 60 is provided with a runner 77 for supporting the same from the ground and connected with the rear end of said runner is a cable 78 which is attached near the forward part of the frame 1 to provide draft and relieve the shaft 58 of the strain incident in the travel of the runner 77.

The elevators 61 and 67 are adapted for conveying beet tops from the machine and may be composed of any suitable material, such as canvas or the like; the former section being provided with a runner 79 similar to the runner 77 and provided with a bearing at the front for revolubly supporting the cranked end portion 80 of the shaft 76. The forward part of said runner is provided with a cable 81, which extends upwardly and connects with the cable 78 to assist in equalizing the draft of the elevators.

Rigidly secured to the runner 79 and extending horizontally from the base of the elevator 61 is a trough 83, having an outer wall 84 which curves inwardly toward the canvas and having a sickle 85 at the forward edge which is actuated by means of a pitman 86 from the crank shaft 80, and which is adapted to sever the beet tops from the bodies and deposit them into the trough 83 to be taken up by the elevator 61. Extending forwardly from the trough 83 are curved fingers 88 which curve downwardly and forwardly and raise the tops into position to be cut.

In order to insure a positive cutting action and delivery of the beet tops into the trough, I have provided a reel 90, which is revolubly mounted in the upright standards 91 on the trough 83 and provided at one end with a sprocket wheel 92 which is driven from a sprocket wheel 93, by means of a chain belt 94. The sprocket wheel 93 is revolubly mounted on a stub shaft 95 on one of the standards 91, and rigidly connected with said sprocket wheel is a bevel gear wheel 96, which meshes with a bevel gear wheel 97 rigidly mounted on the shaft 76, so that the reel and sickle are driven simultaneously with the elevator 61.

I prefer to make the several shafts 58, 59, etc., in two parts and provide couplings 99 for connecting them rigidly together, so that in case the forward elevators 61 and 67 are not needed, they can be readily removed and the forward bracket 54 moved back to support the free ends of the shafts. In this form the machine could be used for various purposes such as digging beets or the like from the ground without removing the tops. Near the forward end of the frame is a driver's seat 100 from which position the driver may readily handle the horses and observe the operation of the machine.

In using the machine, presuming the parts to be constructed and assembled as described, the elevators 66 and 67 are adjusted to the height of a wagon box, and the elevators 60 and 61 lowered, so that the runners 77 and 79 touch the ground. The machine is then started and the plow lowered into the ground by means of the windlass 40. As soon as the plow reaches the row of beets the lever 47 is shifted to mesh the bevel gear wheels 45 and 57 and actuate the elevators, sickle and reel, so that the beet tops are lifted by the fingers 88, cut by the sickle 85 and thrown into the trough 83 by the reel 90 from which point they are carried by the elevators 61 and 67 to the wagon box. After the tops are removed, the mold-board 21 lifts the beet bodies and some dirt from the earth and deposits them onto the elevator 60 which carries them upwardly, removes the dirt and deposits them onto the elevator 66, from where they are conveyed to the wagon box. If the rows are not quite straight, the plow may be shifted laterally to meet the beets, by means of the handle 29.

Having thus described my invention, what I claim as new therein, and desire to secure by Letters-Patent, is:

1. A beet harvester comprising a frame, a plow, a lever having notches therein, means on the frame for engagement by the notched lever to support the plow, and means for lifting the plow.

2. A beet harvester comprising a frame, a plow, a lever pivotally mounted on said plow and having a plurality of edge notches, a pin supported by the frame and adapted for engagement by any one of the lever notches, and a windlass for lifting or lowering said plow.

3. A beet harvester comprising a frame, a plow, a lever pivotally mounted on said plow and having a plurality of edge notches, brackets on said frame, a pin extending between said brackets and adapted for engagement by any one of said notches, and a windlass for lifting said plow.

4. A beet harvester comprising a frame, a plow, a lever pivotally mounted on said plow and having a plurality of edge notches, a pin supported on said frame and adapted for taking into any one of said notches to pivotally support the lever, a platform on said frame having a slotted aperture for receiving said lever, a notched quadrant on said platform adjacent said aperture, and an elongated pawl on said lever adapted for projection into said notched quadrant at various points in the pivotal movement of said lever.

In testimony whereof I affix my signature in presence of two witnesses.

JOHN H. TIETGE.

Witnesses:
LYNN A. ROBINSON,
LETA E. COATS.